US 10,775,977 B2

United States Patent
Sowden et al.

(10) Patent No.: US 10,775,977 B2
(45) Date of Patent: Sep. 15, 2020

(54) IMAGE DISPLAY WITH SELECTIVE DEPICTION OF MOTION

(71) Applicant: Google LLC, Mountain View, CA (US)

(72) Inventors: Paul Sowden, Palo Alto, CA (US); Leslie Ikemoto, Mountain, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/258,406

(22) Filed: Jan. 25, 2019

(65) Prior Publication Data

US 2020/0241716 A1 Jul. 30, 2020

(51) Int. Cl.
*G06F 3/0484* (2013.01)
*H04N 5/232* (2006.01)
*G06N 3/08* (2006.01)
*G06F 9/30* (2018.01)

(52) U.S. Cl.
CPC .......... *G06F 3/0484* (2013.01); *G06F 9/3004* (2013.01); *G06N 3/08* (2013.01); *H04N 5/23251* (2013.01)

(58) Field of Classification Search
CPC ....... G06F 3/0484; G06F 9/3004; G06N 3/08; H04N 5/23251
USPC ........................................................ 715/771
See application file for complete search history.

(56) References Cited

U.S. PATENT DOCUMENTS

| | | | |
|---|---|---|---|
| 6,834,128 B1 | 12/2004 | Altunbasak et al. | |
| 8,494,283 B2 | 7/2013 | Joshi et al. | |
| 9,646,227 B2 | 5/2017 | Suri et al. | |
| 9,858,295 B2 | 1/2018 | Murphy-Chutorian et al. | |
| 2007/0206917 A1* | 9/2007 | Ono .................... | G11B 27/005 386/220 |
| 2017/0161651 A1 | 6/2017 | Demarchi et al. | |
| 2018/0293741 A1 | 10/2018 | Hong et al. | |

FOREIGN PATENT DOCUMENTS

WO      2017/196401      11/2017

OTHER PUBLICATIONS

Perez, Sarah, https://techcrunch.com/2015/10/27/lean-cleans-up-live-photos/?_ga=2.236003272.833000594.1547205317-503991623.1545649069, Oct. 27, 2015, 4 pages.

(Continued)

*Primary Examiner* — Andrey Belousov
(74) *Attorney, Agent, or Firm* — IP Spring

(57) ABSTRACT

Implementations described herein relate to methods, devices, and computer-readable media to display a motion image that includes a plurality of frames. In some implementations, a computer-implemented method includes determining a motion score for the motion image based on the plurality of frames. The method further includes determining whether the motion score meets a display threshold. If the motion score meets the display threshold, the method further includes causing the motion image to be displayed with subject motion by displaying the plurality of frames of the motion image in succession. If the motion score does not meet the display threshold, the method further includes causing the motion image to be displayed without subject motion by displaying a particular frame of the motion image.

16 Claims, 7 Drawing Sheets

(56) References Cited

OTHER PUBLICATIONS

Perez, Sarah, https://techcrunch.com/2015/12/18/lively-lets-you-trim-your-iphones-live-photos-pick-your-best-shot-from-the-video/, Dec. 18, 2015, 6 Pages.
"International Search Report and Written Opinion in International Application No. PCT/US2019/053690", 10 Pages, Nov. 27, 2019.

* cited by examiner

IMAGE DISPLAY WITH SELECTIVE DEPICTION OF MOTION

BACKGROUND

Users can capture images, including static images such as photos; images that include subject motion, sometimes referred to as motion stills, motion photos, or live photos; 360 degree images; videos etc. Devices used to capture or view images, e.g., cameras, smartphones, wearable devices, computers, etc. may have limited capacity to store images. Images that include subject motion include a plurality of frames may require higher storage capacity than photos or still images. In such situations, users need to provide manual input regarding the images to store in the local storage of the user device.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, devices, and computer-readable media to display a motion image that includes a plurality of frames. In some implementations, a computer-implemented method includes determining a motion score for the motion image based on the plurality of frames. The method further includes determining whether the motion score meets a display threshold. If the motion score meets the display threshold, the method further includes causing the motion image to be displayed with subject motion by displaying the plurality of frames of the motion image in succession. If the motion score does not meet the display threshold, the method further includes causing the motion image to be displayed without subject motion by displaying a particular frame of the motion image.

Some implementations include a computer-implemented method to display a motion image that includes a plurality of frames. The method can include determining a motion score for the motion image based on the plurality of frames of the motion image. The method can further include determining whether the motion score meets a display threshold. If the motion score meets the display threshold, the method can further include causing the motion image to be displayed with subject motion by displaying the plurality of frames of the motion image in succession. If the motion score does not meet the display threshold, the method can further include causing the motion image to be displayed without subject motion by displaying a particular frame of the plurality of frames of the motion image.

In some implementations, the motion image is displayed in a user interface that includes one or more other images. In these implementations, if the motion score meets the display threshold, a size of the motion image in the user interface is larger than at least one of the one or more other images.

In some implementations, the method can include determining a respective motion score of the one or more other images. The method can further include selecting the display threshold based on the respective motion scores. The selecting includes determining a number of the one or more other images that are associated with respective motion scores higher than the motion score of the motion image. If the number is equal to or higher than a threshold number, the selecting further includes setting the display threshold higher than the motion score of the motion image. If the number is lower than the threshold number, the selecting further includes setting the display threshold lower than the motion score of the motion image. Some implementations further include determining the threshold number based at least in part on a number of execution threads of a software application that displays the motion image.

In some implementations, determining the motion score includes determining, based on respective pixel values of the plurality of frames, a level of stability of a background portion of the motion image, a type of a subject of the motion image, and a level of movement of the subject in the motion image and calculating the motion score based on the level of stability, the type of the subject, and the level of movement of the subject. In some implementations, when the type of subject is landscape or inanimate object, calculating the motion score comprises setting the motion score to a value less than the display threshold.

In some implementations, calculating the motion score includes determining whether the level of movement of the subject meets a threshold level of movement. If it is determined that the level of movement of the subject meets the threshold level of movement, calculating the motion score further includes setting the motion score to a value that meets the display threshold. If it is determined that the level of movement of the subject does not meet the threshold level of movement, calculating the motion score further includes setting the motion score to a value that does not meet the display threshold. In some implementations, a first type of subject is face and a second type of subject is body, and a first threshold level of movement associated with the face is lower than a second threshold level of movement associated with the body.

In some implementations, determining the motion score for the motion image can further include setting the motion score to a value that meets the display threshold if a count of views of the motion image meets a viewership threshold or if at least one motion artifact was created based on the motion image.

In some implementations, determining the motion score for the motion image includes applying a trained machine-learning model that comprises a neural network that includes a plurality of nodes organized in a plurality of layers and that is configured to determine motion scores. In these implementations, the motion image is provided as an input to the trained machine-learning model.

In some implementations, the motion image is captured by a client device and stored in a volatile memory of the client device. In these implementations, the method can further include determining that the motion score meets a storage threshold. If the motion score meets the storage threshold, the method can further include storing the motion image in a non-volatile memory of the client device. If the motion score does not meet the storage threshold, the method can further include automatically changing the motion image to a static image that includes only a particular frame of the plurality of frames and has a smaller file-size than the motion image. In some implementations, changing the motion image to a static image includes removing other frames of the plurality of frames and storing the static image in the non-volatile memory of the client device.

Some implementations can include a device to display a motion image that comprises a plurality of frames. The device can include a processor and a non-transitory computer readable medium with instructions stored thereon. The instructions, when executed by the processor cause the processor to perform operations that can include determining a motion score for the motion image based on the plurality of frames. The operations can further include determining whether the motion score meets a display threshold. If the motion score meets the display threshold, the operations can further include causing the motion image to be displayed with subject motion by displaying the plurality of frames of the motion image in succession. If the motion score does not meet the display threshold, the operations can further include causing the motion image to be displayed without subject motion by displaying a particular frame of the plurality of frames of the motion image.

In some implementations, the operations to determine the motion score for the motion image include applying a trained machine-learning model, stored on the device, that comprises a neural network that includes a plurality of nodes organized in a plurality of layers and that is configured to determine motion scores. In some implementations, the motion image is provided as an input to the trained machine-learning model.

In some implementations, the operations can further include determining that a count of views of the motion image meets a viewership threshold or that a motion artifact was created from the motion image. The operations can further include, in response to the determination, updating the trained machine-learning model. In some implementations, updating the trained machine-learning model includes adjusting a weight of at least one of the plurality of nodes. In some implementations, updating the trained machine-learning model includes updating a connection between at least one pair of nodes of the plurality of nodes.

In some implementations, the operations can further include determining a level of stability of a background portion of the motion image and determining a type of a subject of the motion image and a level of movement of the subject in the motion image. In some implementations, the level of stability of the background portion, the type of the subject, and the level of movement of the subject are provided to the trained machine-learning model as further inputs.

In some implementations, the operations can further include receiving user input to display the motion image as a static image by displaying only a particular frame of the plurality of frames. The operations can further include, in response to the user input, updating the trained machine-learning model. In some implementations, updating the trained machine-learning model includes adjusting a weight of at least one of the plurality of nodes. In some implementations, updating the trained machine-learning model includes updating a connection between at least one pair of nodes of the plurality of nodes.

In some implementations, the device can further include a camera that captures the motion image. In some implementations, the motion image is stored in volatile memory of the device. In these implementations, the operations can further include determining whether the motion score meets a storage threshold. If the motion score meets the storage threshold, the operations can further include storing the motion image in a non-volatile memory of the device. If the motion score does not meet the storage threshold, the operations can further include automatically changing the motion image to a static image that includes only a particular frame of the plurality of frames and has a smaller file-size than the motion image. In some implementations, changing the motion image to a static image can include removing other frames of the plurality of frames and storing the static image in the non-volatile memory of the device.

Some implementations can include a non-transitory computer readable medium with instructions stored thereon that, when executed by a processor, cause the processor to perform operations that can include determining a motion score for a motion image based on a plurality of frames of the motion image. The operations can further include determining whether the motion score meets a display threshold. If the motion score meets the display threshold, the operations can further include causing the motion image to be displayed with subject motion by displaying the plurality of frames of the motion image in succession. If the motion score does not meet the display threshold, the operations can further include causing the motion image to be displayed without subject motion by displaying a particular frame of the plurality of frames of the motion image.

In some implementations, the non-transitory computer readable medium can include further instructions stored thereon that, when executed by the processor, cause the processor to perform operations that can include determining a level of stability of a background portion of the motion image and determining a type of a subject of the motion image and a level of movement of the subject in the motion image. In some implementations, the motion score is based on the level of stability, the type of the subject, and the level of movement of the subject.

In some implementations, the non-transitory computer readable medium can include further instructions stored thereon that, when executed by the processor cause the processor to perform operations that can include determining a respective motion score of one or more other images and selecting the display threshold based on the respective motion scores. In some implementations, the operation of selecting can include determining a number of the one or more other images that are associated with respective motion scores higher than the motion score of the motion image. If the number is equal to or higher than a threshold number, the operation further includes setting the display threshold higher than the motion score of the motion image. If the number is lower than the threshold number, the operation further includes setting the display threshold lower than the motion score of the motion image.

DETAILED DESCRIPTION

Figure 1:
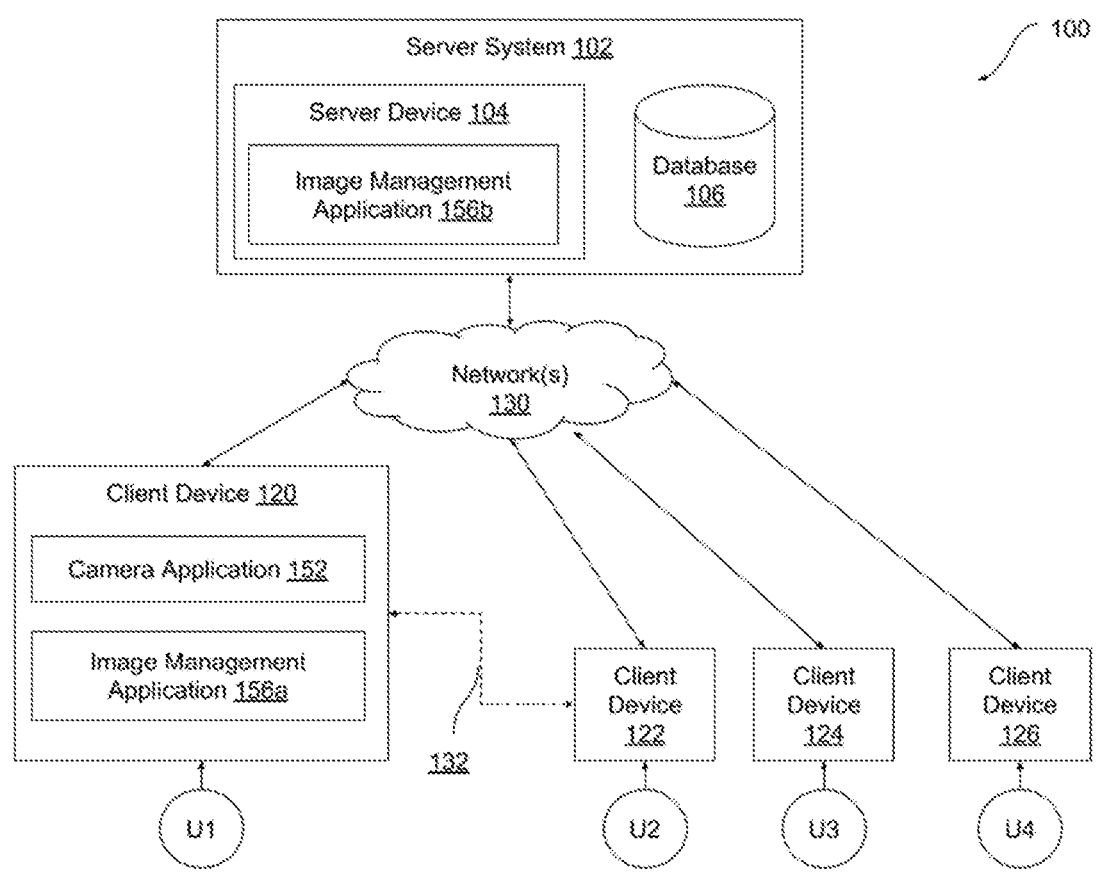
FIG. 1 is a block diagram of an example network environment which may be used for one or more implementations described herein.

Some implementations include methods, devices, and computer-readable media with instructions to display a motion image that includes a plurality of frames. For example, a motion image may include a plurality of frames captured with a camera over a short time duration, e.g., less than or equal to three seconds. The motion image may be captured without significant camera movement, e.g., without a pan, zoom, tilt, or other operation that requires movement of the camera.

A motion image may depict a subject and a background. Users have varying levels of interest in motion images, e.g., a motion image that depicts a friend breaking into a smile, a pet jumping, a dance move, sporting action, etc. may be of high interest to users. In another example, a motion image that depicts little to no movement during the plurality of frames, a motion image that does not include a subject of user interest, e.g. images of documents or inanimate objects, etc. may be of low interest to users.

A technical problem is that devices that have the capability to capture, display, or store motion images waste computational resources in such operations. For example, many devices offer a default setting to capture motion images. Such a device may capture and store a motion image, which requires a camera of the device to be operated and the resulting image data to be stored on the device. In this case, even when the motion image does not enhance user experience when displayed as a motion image, device resources are utilized to capture and store the motion image, wasting computational capacity to capture and process the motion image, and storage capacity to store the motion image. For example, a displayed motion image provides a quality user experience when there is significant subject motion in the image that can be perceived by a viewing user. Further, when a user views such a motion image, processor, memory, and display screen of the device are utilized to load the plurality of frames and display the motion image depicting the subject motion. While users can selectively disable capture, storage, or display of motion images, such settings are global in nature, and do not take into account individual image characteristics or user preferences.

Implementations described herein automatically determine a motion score for a motion image by analyzing the plurality of frames of the motion image. If the motion score of a motion image meets a display threshold, the plurality of frames depicting the subject motion are displayed in a user interface; else, a particular frame of the motion image is displayed, providing a static image. Selective display in this manner can reduce use of computational resources utilized to display motion images.

In some implementations, a user interface that displays a plurality of images is provided. In these implementations, the motion score is evaluated to display only a limited number of images as motion images, e.g., based on available hardware capacity. For example, the number of images may be based on a number of threads of a program or software application that generates the user interface that can executed on the available hardware. Rendering of the user interface is thus tailored to available hardware resources, which can enable different types of devices to display the user interface without needing to modify the implementing code, or modifying the motion images. Further, in some implementations, the size of a motion image in the user interface is determined based on a motion score of the motion image. Such customization of image size can provide a user interface that's easier to use. For example, image grids that include images of different sizes display certain images at a larger size than other images, allowing user to perceive greater level of detail in such images, e.g., since a greater share of available display screen space is utilized for such images. Such display can enable the user to make determination regarding whether to edit the image, view the image in full-screen, generate an image-based creation, share image, etc. with greater certainty than when the images are displayed at a smaller size. Selectively displaying certain images at larger size also ensures that any number of images can be displayed on the screen, while still displaying sufficient image detail.

Further, in some implementations, the motion score is compared to a storage threshold, and the motion image is changed to a static image (that includes a single frame) prior to storage. Such selective conversion can lower the storage capacity required to store motion images. When user images are uploaded to a server, the selective conversion can reduce transmission costs to send the image to the server and reduce utilization of server storage capacity to store motion images.

In still further implementations, a trained machine-learning model is utilized to determine motion scores. The trained ML model may offer a computationally efficient mechanism to determine motion scores since the model is optimized for this purpose and can be implemented on special-purpose hardware such as FPGA, ASIC, GPU, or a machine-learning processor.

In some implementations in which a trained ML model is utilized, if the user permits, the model is updated based on user interaction, e.g., viewing a motion image, generating a motion artifact, discarding motion component (frames) from a motion image, etc. Such updates to the model can provide further improve display and storage of motion images, since motion scores determined by the model are specific to the user. Still further, when users permit, such model updates may be received from a large number of users and may be used to further train the ML model, e.g., in a federated learning approach, to improve determination of motion scores.

In some implementations in which the motion score is determined upon image capture and prior to storage in non-volatile memory, the described techniques can reduce use of non-volatile memory, by discarding frames of the motion image that are not likely of user interest. In some implementations, the techniques described herein provide a user interface to enable users to selectively discard motion. This reduces use of resources, compared to a default mode of capture of motion images.

FIG. 1 and the other figures use like reference numerals to identify like elements. A letter after a reference numeral, such as "156a," indicates that the text refers specifically to the element having that particular reference numeral. A reference numeral in the text without a following letter, such as "156," refers to any or all of the elements in the figures bearing that reference numeral (e.g. "156" in the text refers to reference numerals "156a" and/or "156b" in the figures).

FIG. 1 illustrates a block diagram of an example network environment 100, which may be used in some implementations described herein. In some implementations, network environment 100 includes one or more server systems, e.g., server system 102 in the example of FIG. 1. Server system can communicate with a network 130, for example. Server system 102 can include a server device 104 and a database 106 or other storage device. Database 106 may store one or more images and metadata associated with the one or more images. In some implementations, server device 104 may provide an image management application 156b. Image management application 156b may access the images stored in database 106.

Network environment 100 also can include one or more client devices, e.g., client devices 120, 122, 124, and 126, which may communicate with each other and/or with server system 102 and/or second server system 140 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, and database 106, and shows four blocks for client devices 120, 122, 124, and 126. Server block 102 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 or second server system 140, and/or via a network service, e.g., a social network service or other type of network service, implemented on server system 102. For example, respective client devices 120, 122, 124, and 126 may communicate data to and from one or more server systems (e.g., system 102, second server system 140).

In some implementations, the server system 102 may provide appropriate data to the client devices such that each client device can receive communicated content or shared content uploaded to the server system 102 and/or network service. In some examples, users U1-U4 can interact via audio or video conferencing, audio, video, or text chat, or other communication modes or applications. A network service implemented by server system 102 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide a camera application 152 and image management application 156a. Client devices 122-126 may also provide similar applications. For example, camera application 152 may provide a user of a respective client device (e.g., users U1-U4 with the ability to capture images using a camera of their respective user device. For example, camera application 152 may be a software application that executes on client device 120.

In some implementations, camera application 152 may provide a user interface. For example, the user interface may enable a user of client device 120 to select an image capture mode, e.g., a static image (or photo) mode, a burst mode (e.g., capture of a successive number of images in a short time period), a motion image mode, a video mode, a high dynamic range (HDR) mode, etc. For example, the motion image mode may correspond to capture of a static image at a time of activation of a camera of client device 120 and capture of a short clip that includes a plurality of frames prior to and subsequent to activation of the camera. For example, the short clip may be of a duration of 1 to 3 seconds.

In some implementations, the motion image may be obtained in a volatile memory of client device 120 as a single image file that includes the static image in an image data portion and the plurality of frames in a second portion, e.g., the image metadata portion. In some implementations, the motion image may be obtained in the volatile memory of client device 120 as two separate image files, a first file that includes the static image and a second file that includes the short clip. In some implementations, the first file and/or the second file may include image metadata that indicates that the other file was captured simultaneously. In some implementations, camera application 152 may implement the methods described herein with reference to FIGS. 2-4. In some implementations, image management application 156a and/or image management application 156b may implement the methods described herein with reference to FIGS. 2-4.

Camera application 152 and image management application 156a may be implemented using hardware and/or software of client device 120. In different implementations, image management application 156a may be a standalone application, e.g., executed on any of client devices 120-124, or may work in conjunction with image management application 156b provided on server system 102. With user permission, image management application 156 may perform one or more automatic functions such as backing up the image (e.g., to database 106 of server system 102), enhancing the image, stabilizing the image, recognizing one or more objects in the image (e.g., a face, a body, an inanimate object, etc.), etc. Image stabilization may be performed based on input from an accelerometer, a gyroscope, or other sensors of client device 120, and/or based on comparison of a plurality of frames of a motion image or video.

Image management application 156 may provide image management functions such as displaying images in a user interface (e.g., in a one-up view that includes a single image, in a grid view that includes multiple images, etc.), editing images (e.g., adjusting image settings, applying filters, changing image focus, removing one or more frames of a motion image or video), sharing images with other users (e.g., of client devices 122-126), archiving an image (e.g., storing the image such that it does not appear in a primary user interface), generating image-based creations (e.g., collages, photo books, motion-based artifacts such as animations, stories, video loops, etc.).

A user interface on a client device 120, 122, 124, and/or 126 can enable display of user content and other content, including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

In some implementations, any of server system 102 and/or one or more client devices 120-126 can provide a communication application program. The communication program may allow a system (e.g., client device or server system) to provide options for communicating with other devices. The communication program can provide one or more associated user interfaces that are displayed on a display device associated with the server system or client device. The user interface may provide various options to a user to select communication modes, users or devices with which to communicate, etc. In some examples, the communication program can provide an option to broadcast a content post to a broadcast area, and/or can output a notification indicating that a content post has been received by the device and the device is in the defined broadcast area for the post. The communication program can display or otherwise output transmitted content posts and received content posts, e.g., in any of a variety of formats. Content posts can include, e.g., images, shared with other users.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

Figure 2:
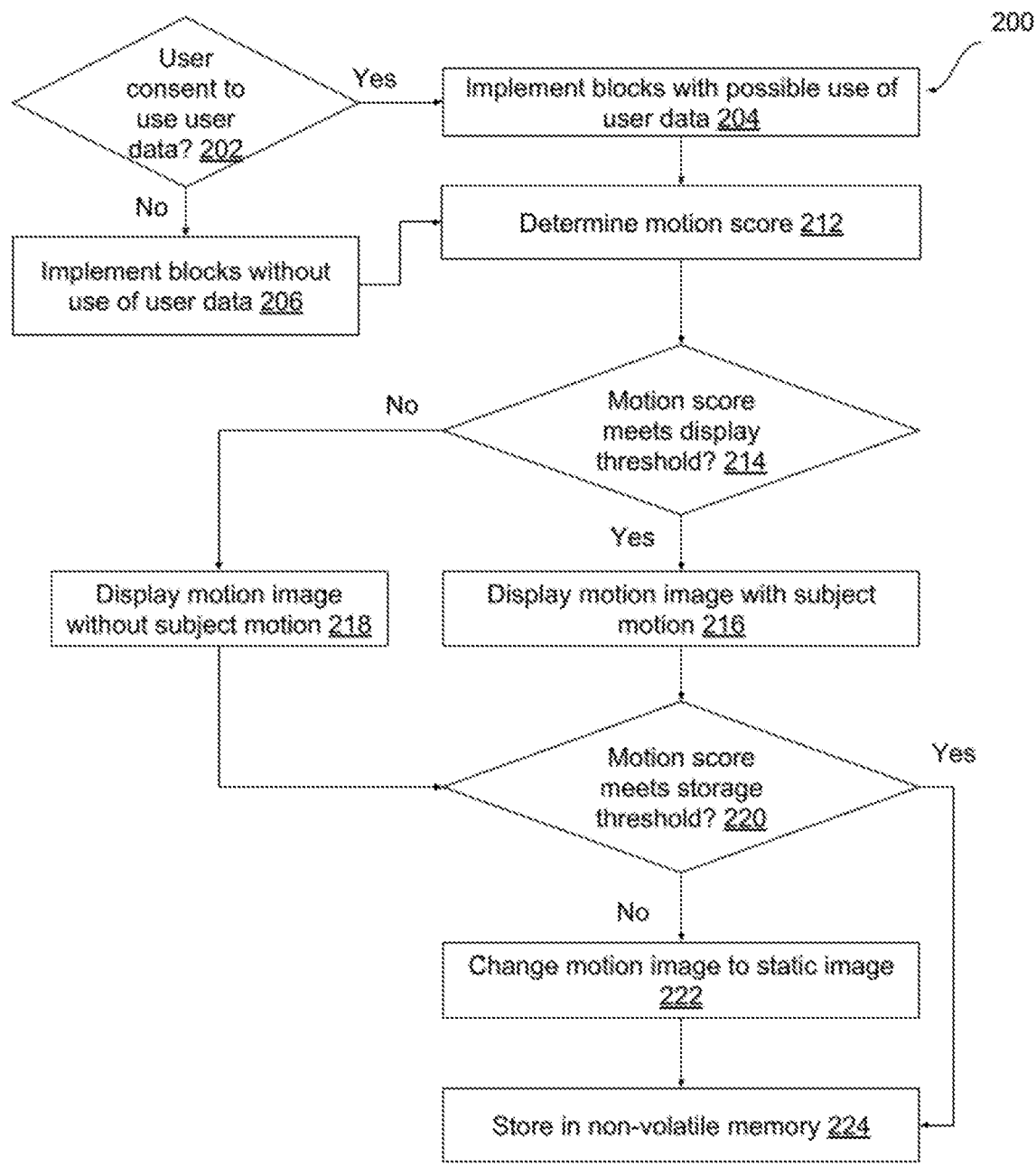
FIG. 2 is a flow diagram illustrating an example method to display and/or store a motion image, according to some implementations.

FIG. 2 is a flow diagram illustrating an example method 200 to display and/or store a motion image, according to some implementations. In some implementations, method 200 can be implemented, for example, on a server system 102 as shown in FIG. 1. In some implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device.

In some implementations, the method 200, or portions of the method, can be initiated automatically by a system. In some implementations, the implementing system is a first device. For example, the method (or portions thereof) can be periodically performed, or performed based on one or more particular events or conditions, e.g., an application (e.g., camera application 152, image management application 156, etc.) being initiated by a user, receiving one or more images that have been newly uploaded to or accessible by the system, a predetermined time period having expired since the last performance of method 200, and/or one or more other conditions occurring which can be specified in settings read by the method. In some implementations, such conditions can be specified by a user in stored custom preferences of the user.

In various implementations, client device 120 can be a standalone camera, another device that includes a camera, e.g., smartphone, tablet, computer, wearable device such as a smartwatch, a headset, etc., or other client device that can receive images captured by another device. In some implementations, client device 120 may be a capture-only device, e.g., a camera that does not include a screen. In some implementations, client device 120 may be a view-only device, e.g., a device that includes a screen on which images can be displayed, but that does not have a camera or other capability to capture images. In some implementations, client device 120 may have both image capture and image viewing capability.

In some implementations, client device 120 may include a single camera to capture images. In some implementations, client device 120 may include a plurality of cameras (or lenses). For example, a smartphone or other device may include one or more front-facing cameras (on the same side of the device as a screen) and/or one or more rear-facing cameras. In some implementations, the one or more front-facing or rear-facing cameras may operate together during image capture, e.g., a first camera may capture depth information and a second camera may capture image pixels. In some implementations, different cameras may be used for different types of image capture, e.g., with different zoom levels (e.g., a telephoto lens, a wide angle lens, etc.). In some implementations, client device 120 may be configured to capture a 360 degree image. In some implementations, the cameras or lenses may capture an image using a single image sensor (e.g., a CCD or CMOS sensor), or a plurality of sensors. In some implementations, other sensors, e.g., a depth sensor, etc. may be used together with the one or more cameras at the time of image capture.

In some implementations, client device 120 may combine raw image data captured at the image sensor from one or more the cameras (or lenses) and other data obtained from other sensors (e.g., accelerometer, gyroscope, location sensor, depth sensor, etc.) to form a single image. For example, when client device 120 is operated in a mode that captures multiple image frames (e.g., a burst mode or a motion mode that captures a plurality of frames in quick succession as a motion image, a video mode that captures a video, a high dynamic range mode that combines multiple images with different exposure into a single composite image, etc.), data obtained from the sensors may be utilized to stabilize the captured image. For example, accelerometer or gyroscope data may be utilized to compensate for camera movement, e.g., due to the capturing user's hands shaking during image capture, by aligning the plurality of captured frames. In some implementations, the captured image may be cropped to produce a stabilized version, e.g., with reduced background motion.

Client device 120 may enable a user to capture images in different modes, e.g., a static image (or photo) mode to capture a single frame, a burst or motion image mode to capture a plurality of frames, a video mode to capture a video, etc. In some implementations, method 200 may be performed at a time of image capture when the camera configures a plurality of frames.

Client device 120 may enable a user to view images, e.g., images captured by the client device 120 or other images associated with the user, in different user interfaces. For example, a one-up mode or a slideshow mode may be provided that enables the user to view a single image at a time. In another example, a gallery mode may be provided that enables the user to view multiples images simultaneously, e.g., as an image grid.

In some implementations, client device 120 may perform the method 200. In another example, a client device or server device can perform the method 200. Some implementations can initiate method 200 based on user input. A user (e.g., operator or end-user) may, for example, have selected the initiation of the method 200 from a displayed user interface, e.g., application user interface or other user interface. In some implementations, method 200 may be implemented by a server device.

In some implementations, method 200 may be initiated automatically, e.g., when a user of a client device operates the camera to capture a motion image, when a user of the client device views images stored on the client device or on a server device, etc.

An image as referred to herein can include a digital image having pixels with one or more pixel values (e.g., color values, brightness values, etc.). An image can be a static image (e.g., still photos, images with a single frame, etc.), or a motion image (e.g., an image that includes a plurality of frames, such as animations, animated GIFs, cinemagraphs where a portion of the image includes motion while other portions are static, a video that includes a plurality of frames with or without audio). Text, as referred to herein, can include alphanumeric characters, emojis, symbols, or other characters.

In block 202, it is checked whether user consent (e.g., user permission) has been obtained to use user data in the implementation of method 200. For example, user data can include images captured by a user using a client devices, images stored or accessed by a user, e.g., using a client device, image metadata, user data related to use of a messaging application, user preferences, user biometric information, user characteristics (e.g., identity, name, age, gender, profession, etc.), information about a user's social network and contacts, social and other types of actions and activities, content, ratings, and opinions created or submitted by a user, a user's current location, historical user data, images generated, received, and/or accessed by a user, images viewed or shared by a user, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 212. If user consent has not been obtained, it is determined in block 206 that blocks are to be implemented without use of user data, and the method continues to block 212. In some implementations, if user consent has not been obtained, blocks are implemented without use of user data and with synthetic data and/or generic or publicly-accessible and publicly-usable data. In some implementations, if user consent has not been obtained, method 200 is not performed.

In block 212, a motion score for a motion image is determined. In some implementations, method 200 may be performed upon capture of a new motion image by a camera. In these implementations, determination of the motion score for the motion image may be performed based on image data (e.g., pixel values of a plurality of frames of the motion image) and image metadata. In some implementations, method 200 may be performed to determine a motion score for a stored motion image (e.g., stored in a non-volatile memory of client device 120) that includes a plurality of frames and for which the motion score is to be determined. For example, determination of the motion score may be performed if the image metadata or other data associated with the motion image (e.g., stored in a database of images) does not include a motion score or includes a motion score that has lapsed. For example, the motion score of a motion image may lapse, e.g., a certain number of days after capture or last viewing of the motion image by a user (e.g., of client device 120), upon the motion image being modified, upon generation of an animated GIF, a video, a collage, or other creation based on the motion image, etc.

Determination of motion score based on the plurality of frames of the motion image may be performed, e.g., using method 300 described with reference to FIG. 3 or method 400 described with reference to FIG. 4. When the motion image is associated with a valid motion score, e.g., that was previously calculated and is stored in image metadata or the database of image, determining the motion score includes accessing the image metadata or the database of images to retrieve the motion score. Block 212 may be followed by block 214.

In block 214, it is determined if the motion score for the motion image meets a display threshold. With user permission, the value of the display threshold may be determined based on user data, e.g., prior views by the user of a user interface that depicts motion images, manual toggling of image capture/viewing mode to include or exclude subject motion, etc. In some implementations, e.g., when the motion image is displayed as part of a user interface that includes one or more other images, the display threshold may set based on a target number of motion images to display at a time, such that no more than the target number of motion images are displayed with motion on (e.g., by displaying the plurality of frames sequentially). In some implementations, e.g., when the motion image is displayed in a single image mode, e.g., in a one-up mode or as part of a slideshow, the display threshold may be set to a value that is determined based on an interestingness of subject motion within the plurality of frames of the motion image when displayed sequentially. For example, interestingness of the subject motion may be based on similarity of the subject motion the motion image to subject motion in other motion images that the user (or other users) viewed with the motion being displayed in one-up or slideshow mode.

In some implementations, e.g., when the motion image is displayed as part of a user interface that includes one or more other images (e.g., as part of an image grid), the display threshold may be set to a value based on motion scores of the one or more other images. For example, if the one or more other images may include other motion images. If at least a threshold number of the one or other images have motion scores higher than that of the motion image, the display threshold may be set to a value such that the motion score of the motion image does not meet the display threshold. For example, the display threshold may be set to a value higher than the motion score of the motion image. If the number of other images that have motion scores higher than that of the motion image is less than the threshold number, the display threshold may be set to a value such that motion score of the motion image meets the display threshold. For example, the display threshold may be set to a value lower than the motion score of the motion image.

In some implementations, the threshold number may be based on hardware capabilities of a device that performs method 200, e.g., client device 120. For example, method 200 may be performed (or invoked) by a software application to display the motion image. The software application may be executed in a multi-threaded manner, e.g., where one or more execution threads of the software application are run on a hardware processor of client device 120. In some implementations, each individual execution thread may process a corresponding motion image to be displayed in grid and render the plurality of frames for display. In these implementations, the threshold number may be based on the number of execution threads, e.g., the threshold number may be less than or equal to the number of execution threads.

In some implementations, the number of execution threads may be based on hardware capabilities, e.g., a number of processing cores of the hardware processor of client device 120, an available memory of client device 120, etc. For example, when each individual execution thread runs on a corresponding processing core, the number of execution threads may not exceed the number of available processing cores. The number of available processing cores may in turn be based on available power (e.g. battery), operating system settings (e.g., configuration settings that limit the number of execution threads per application), etc.

Selection of the threshold number based on the hardware capabilities can ensure that the number of motion images rendered for display in a user interface, e.g., an image grid, is supported by the hardware. For example, the threshold number may be set to 1 (e.g., if only a single processing core is available to render images in the image grid) such that the image grid includes only one image that includes plurality of frames. In this example, other motion images in the motion grid are displayed as static images, by rendering a single frame of each of the other motion images for display. In another example, if 4 cores are available to render images in the motion grid, the threshold number may be set to 4. Setting the threshold number in this manner offers the technical benefit that the image grid is rendered without delay and using available hardware capabilities.

If the motion score of the motion image meets the display threshold, block 214 is followed by block 216. If the motion score of the motion image does not meet the display threshold, block 214 is followed by block 218.

In block 216, the motion image is caused to be displayed with subject motion. The motion image may be displayed as part of a user interface, e.g., provided by an image gallery application. In some implementations, displaying the motion image includes displaying the plurality of frames of the motion image in succession, e.g., such that subject motion within the plurality of frames of motion image is perceivable by the user. For example, the motion image may be displayed in a user interface in a one-up mode or a slideshow mode, where a single image is displayed at a time.

In some implementations, displaying the motion image further includes displaying the motion image with a larger size than other images in a user interface that includes an image grid that includes a plurality of images. Contextual selection of the threshold number, as described with reference enables display of the image grid with one or more motion images that are associated with a motion score that meets the display threshold to be displayed with subject motion. In some implementations, a motion image associated with a motion score that meets the display threshold may be displayed at a larger size in the user interface than one or more other images in the grid. Other motion images in the user interface that are associated with respective scores that do not meet the display threshold are displayed in the user interface without subject motion, e.g., by displaying only a particular frame of such motion images. Block 216 may be followed by block 220.

If the motion score of the motion image does not meet the display threshold, block 218 is performed to display the motion image without subject motion, e.g., by displaying only a particular frame of the motion image. Display of a particular frame in this manner may save computational resources, since other frames of the motion image are not displayed. Block 218 may be followed by block 220.

In block 220, it is determined if the motion score meets a storage threshold. The storage threshold may be based on various factors. For example, the storage threshold may be based on available non-volatile memory capacity of a user device that stores the motion image, e.g., client device 120. In another example, e.g., when the motion image is stored on a server, the storage threshold may be based on a storage capacity of the server allocated to a particular user account that stores the motion image. In some implementations, the storage threshold may be set based on a combination of non-volatile memory capacity of the user device and the allocated storage capacity of the server. If the motion score meets the storage threshold, block 220 is followed by block 222. If the motion score does not meet the storage threshold, block 220 may be followed by block 224.

In block 222, the motion image is changed to a static image. For example, when method 200 is performed upon capture of a motion image by a client device, the motion image may be temporarily stored in a volatile memory (e.g., RAM) of the client device. When the motion image does not meet the storage threshold, only a particular frame of the plurality of frames of the motion image is stored, e.g., written to non-volatile memory of the client device. Other frames of the plurality of frames of the motion image are removed prior to storing the image.

For example, the plurality of frames may include one or more frames captured before user activation of a camera of the client device by the user, a single frame captured at the instant of user activation, and one or more frames captured after the user activation. For example, a motion image may have a total length of up to 3 seconds. In some implementations, the particular frame may be the single frame captured at the instant of user activation, e.g., associated with a timestamp that matches activation of the camera. In some implementations, the particular frame may be any other frame of the plurality of frames of the motion image.

For example, the particular frame may be selected based on different characteristics of the motion image that are determined based on programmatically analyzing the image. For example, such characteristics may include level of blur in the frame, whether the frame depicts a human subject with a smiling face and/or eyes open, a quality of focus on the subject, etc. The different characteristics for each frame may be evaluated to determine a quality score and the frame associated with the highest quality score may be selected as the particular frame. In some implementations, the particular frame may be selected randomly.

Changing the motion image to a static image provides technical benefits. For example, since the static image that includes a single frame, the file-size of the static image is smaller than that of the motion image that includes the plurality of frames. Storing a static image therefore requires less storage space. Further, transmitting the static image, e.g., to a server device, or to other client devices, reduces network utilization. Block 222 may be followed by block 224.

In block 224, the image is stored in non-volatile memory, e.g., of the client device 120, a non-volatile memory of a server device, or both. When block 224 is performed after block 220, the motion image (that includes a plurality of frames) is stored, and when block 224 is performed after block 222, the static image is stored.

While method 200 has been described with reference to various blocks in FIG. 2, it may be understood that techniques described in this disclosure may be performed without performing some of the blocks of FIG. 2. In various implementations, some of the blocks of method 200 may be performed in parallel or in an order different from that illustrated in FIG. 2.

For example, in some implementations where method 200 is performed to display a user interface that includes one or more pre-stored images, blocks 220-224 may not be performed. In another example, e.g., when method 200 is performed upon immediately upon capture of a motion image and where the user has provided an indication that motion images are to be stored as captured, blocks 220 and 222 are not performed, and block 224 is performed after block 216 or block 218. In some implementations, e.g., when the user has provided an indication to always display motion images with subject motion, block 214 is not performed, and block 216 is performed following block 212. In a further variation of these implementations, block 216 may be performed to display the motion image, and block 212 may be performed after block 216 to determine the motion score.

Still further, some implementations may exclude display of the motion image altogether, e.g., blocks 214-218 are not performed in such implementations. In these implementations, a motion score is determined for the motion image (block 212) and if the motion score meet a storage threshold (block 220), the motion image is selectively converted to a static image (block 222). The motion image or the static image is stored in a non-volatile memory (block 224). For example, a server device may utilize these implementations to save usage of storage. In these implementations, the image may be displayed after storing the image, e.g., the image is displayed as a motion image if the stored version is a motion image, and as a static image, if the stored version is a static image.

Still further, in some implementations, blocks 214-218 may be performed after blocks 212 and 220-224, e.g., to display motion images that have previously been stored. In these implementations, the motion score may be stored along with the image, or may be recomputed at a time of display of the image.

Figure 3:
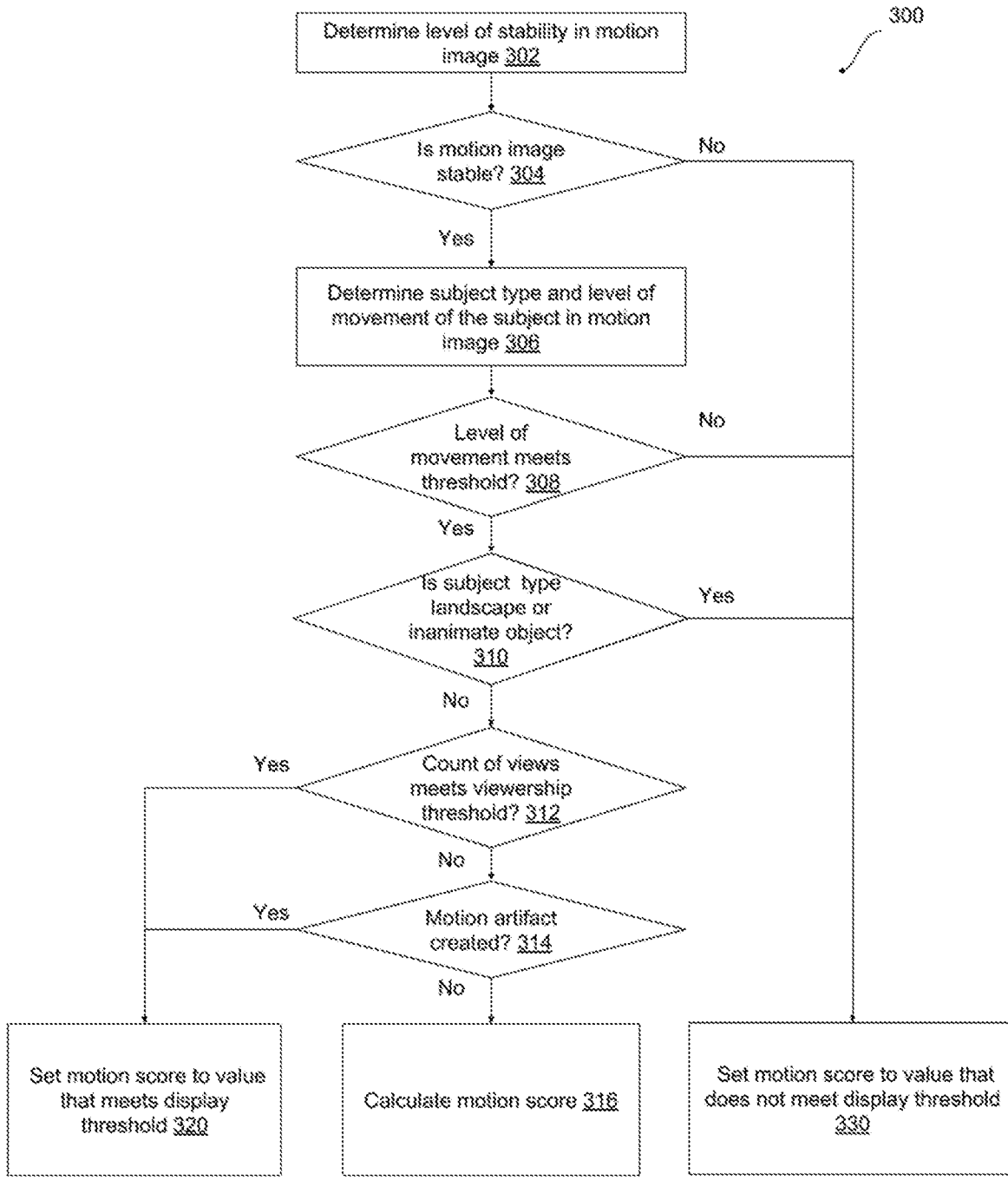
FIG. 3 is a flow diagram illustrating an example method to determine motion score for a motion image, according to some implementations.

FIG. 3 is a flow diagram illustrating one example of a method 300 to determine motion score for a motion image, according to some implementations. In some implementations, method 300 can be implemented, for example, on a server system 102 as shown in FIG. 1. In some implementations, some or all of the method 300 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 300. In some examples, a first device is described as performing blocks of method 300. Some implementations can have one or more blocks of method 300 performed by one or more other devices (e.g., other client devices or server devices) that can send results or data to the first device.

In some implementations, the method 300, or portions of the method, can be initiated automatically by a system. In some implementations, the implementing system is a first device. For example, the method (or portions thereof) can be periodically performed, or performed based on one or more particular events or conditions, e.g., an application (e.g., camera application 152, image management application 156, etc.) being initiated by a user, receiving one or more images that have been newly uploaded to or accessible by the system, a predetermined time period having expired since the last performance of method 300, and/or one or more other conditions occurring which can be specified in settings read by the method. In some implementations, such conditions can be specified by a user in stored custom preferences of the user.

In various implementations, client device 120 can be a standalone camera, cell phone, smartphone, tablet computer, wearable device, or other client device that can receive content input (e.g., image capture) by a user to the client device, and can perform the method 300. In another example, a client device or server device can perform the method 300. Some implementations can initiate method 300 based on user input. A user (e.g., operator or end-user) may, for example, have selected the initiation of the method 300 from a displayed user interface, e.g., application user interface or other user interface. In some implementations, method 300 may be implemented by a client device. In some implementations, method 300 may be implemented by a server device.

In block 302, the level of stability of the motion image is determined. In some implementations, the level of stability may be determined based on a comparison of pixel values of corresponding pixels in successive frames of the plurality of frames of the motion image. For example, when a significant proportion (e.g., 90%) of the pixels match, e.g., have equal or similar values, it may be determined that the image is stable. In some implementations, the motion image may be programmatically analyzed to determine a background portion of the motion image. In these implementations, the comparison of pixel values may be performed only for the subset of the pixels that correspond to the background portion, In some implementations, the level of stability may be determined based on data obtained from one or more sensors of a device that captured the motion image, e.g., client device 120. For example, such data may include readings from an accelerometer and/or a gyroscope of the device. For example, if the data from sensors indicates that the device did not move or rotate during capture of the motion image (e.g., which may be performed over a short duration of time, e.g., up to 3 seconds), it may be determined that the level of stability is high. On the other hand, device movement during capture (e.g., indicated by a displacement and/or rotation of the device, as measured by the sensors), may indicate a low level of stability.

In some implementations, determination of the level of stability may be based on pixel values of the plurality of frames and on sensor readings. Other techniques to determine the level of stability may also be used. Block 302 may be followed by block 304.

In block 304, it is determined if the motion image is stable. For example, the level of stability of the motion image may be compared to a stability threshold. If the level of stability meets the stability threshold, block 304 is followed by block 306. Else, block 304 is followed by block 330.

In block 306, the motion image is programmatically analyzed to detect a subject of the motion image and determine a type of the subject. For example, object recognition techniques may be utilized to detect the presence of various objects in the motion image, e.g., a human face, a human body, an animal, trees, and inanimate objects such as buildings, furniture, vehicles, etc. The subject of the motion image may be determined as one or more objects that appear near a center of the plurality of frames, objects that are in focus, objects that occupy the largest area within the image, etc. For example, a motion image that depicts a human face in focus and/or at the center, may correspond to subject type "human face" or "portrait." In another example, a motion image that depicts a group of people may correspond to subject type "group photo." In yet another example, a motion image that depicts a dog, a cat, or other animal may correspond to subject type "pets" or "animals" etc.

The plurality of frames of the motion image may also be analyzed to determine the level of movement of the subject within the motion image. For example, if the subject type is a "human face," the level of movement may be determined based on a change in pixel values of the face in the plurality of frames. In this example, a motion image with little to no change in expression may correspond to low level of movement of the subject, whereas a motion image where the subject breaks out into a smile, raise eyebrows, turns or tilts the face, etc. may correspond to a high level of movement of the subject.

In another example, if the subject type is human body, subject motion such as jumping or moving from one spot to another may correspond to a high level of movement, while stationary subjects that move in other ways (e.g. raise hand, tilt head, etc.) may correspond to low level of movement. In some implementations, the threshold level of movement used for comparison may be based on the subject type, e.g., a lower threshold may be used when the subject is a face than when the subject is a body. Various techniques to detect movement of the subject may be utilized, e.g., optical flow, image segmentation, image registration, etc. For example, an object recognition technique may be utilized to detect an object and optical flow of pixels corresponding to the object, e.g., outer borders of the object may be measured to determine the level of movement of the object. In another example, image registration techniques may be utilized to align pixels of the plurality of frames, and the change in position of the object, as indicated by different pixel coordinates, may be utilized to determine the level of movement. In some implementations, a combination of techniques may be utilized. Block 306 may be followed by block 308.

In block 308, it is determined if the level of movement of the subject meets a threshold level of movement. If it is determined that the level of movement of the subject meets the threshold, block 308 is followed by block 310. Else, block 308 is followed by block 330.

In block 310, it is determined if the subject type is landscape or inanimate object. For example, the type of subject of the motion image is determined as landscape, e.g., when the detected objects include objects such as mountains, trees, rivers, ocean, etc. and as inanimate object e.g., when the detected objects include objects such as furniture, buildings, automobiles, etc. In some implementations, e.g., when a human or animal (e.g., pet) is detected in the image that has landscape or inanimate objects, the subject type is not landscape or inanimate object, since the human or animal subject has been detected. If the type of subject is landscape or inanimate object, block 310 is followed by block 330. Else, block 310 is followed by block 312.

In block 312, it is determined if a count of views of the motion image meets a viewership threshold. For example, if the plurality frames of the motion image have previously been viewed in succession, thereby providing display of subject motion, at least a threshold number of times, the motion image is determined to meet the viewership threshold. For example, a stored image that the user (or other users with whom the image was shared) viewed multiple times, e.g., 5 times, 10 times, etc. may be determined to meet the viewership threshold such that the motion in the image is of interest to users. If the count of views of the motion image meets the viewership threshold, block 312 may be followed by block 320. Else, block 312 may be followed by block 314.

In block 314, it is determined if a motion artifact was created from the motion image. For example, the motion artifact may include an animated GIF or other animation, e.g., that includes two or more frames of the motion image. For example, the motion artifact may include the two or more frames set to play in a loop. The two or more frames in the loop may be played in a sequential order, e.g., a first frame followed by a second frame, which in turn is followed by a third frame. The motion artifact may be a forward loop in which the first frame is provided after the last frame, to provide a continuous, non-stop animation. The motion artifact may be a reversing loop (also known as boomerang) in which the frames are played in sequential order from the first to the last frame, followed by a reverse order from the last frame to the first, in repeating manner to provide a continuous animation. In some implementations, the motion artifact may include other creations based on the motion image, e.g., a collage that includes two or more frames of the motion image, a motion blur image that superimposes two or more frames of the motion image into a single static image, etc.

The camera application, the image gallery application, or any other application may provide the functionality to create motion artifacts, e.g., automatically or manually. If the motion artifact was created, e.g., the user created the motion artifact by providing input, or chose to save an automatically generated motion artifact, block 314 may be followed by block 316. Else, block 314 may be followed by block 320.

In block 316, a motion score is calculated for the motion image. In some implementations, the motion score may be based on one or more of the level of stability of the motion image, the type of the subject of the motion image, or a level of movement of the subject in the plurality of frames of the motion image. For example, the motion score may be a weighted combination of the level of stability and the level of movement of the subject in the motion. In some implementations, greater level of stability may correspond to higher motion scores and vice versa. In some implementations, greater level of movement of the subject may correspond to higher motion scores and vice versa. In some implementations, the level of movement of the subject may be assigned different weights based on the type of subject. For example, a higher weight may be assigned to the level of movement if the subject type is face than if the subject type is body.

In some implementations, one or more other factors may be utilized in addition to the foregoing. For example, if the user permits use of face recognition techniques, it may be determined whether the subject of the image is a person or animal (e.g., pet) that is known to the user (e.g., part of the user's social network, depicted in other images captured by the user or stored in the image gallery of the user, etc.). The motion score for motion images that depict known subjects may be higher than motion images that depict unknown subjects, other factors being equal. In some implementations, certain subject types may be associated with higher weights, e.g., motion images that depict sports or athletic activity, dance, etc. and motion images that depict such subject types may correspondingly receive higher motion scores. In other words, a high motion score is indicative for a variation across frames of a motion image that is perceived by the user as large or significant such the motion aspect of the image increases and enhances, when displayed, user experience, perception and information obtained by the user by the motion aspect. On the other hand, a low motion score is indicative of little or insignificant variation across frames of a motion image such that loss of motion information, either through static display or removal of motion information and conversion of the motion image to a static image does not degrade or may even improve user experience and perception and recognition of the image content. In the latter case, for example, the motion aspect included in a motion image may include shakiness caused by the jitter or tremble of the camera when a motion image is captured of a static scene. In this situation, the motion information and the display of the image as a motion image may actually degrade user perception, e.g., since the user is not able to properly focus and recognize details of the static scene due to shakiness introduced by the motion aspect.

In some implementations, the motion image may include or be associated with labels that indicate a subject type (e.g., an "archive" label that indicates that the subject type is document, screenshot, receipt, etc.) and such labels may be utilized to determine the motion score. In some implementations, the motion image may include sound, e.g., recorded during capture of the motion image. In these implementations, the sound may be programmatically analyzed to determine whether it corresponds to a category of sound that is associated with motion of interest, e.g., the sound of a waterfall, the sound of a bat hitting a ball, dance music, laughter, etc. may be associated with motion of interest, while other sounds such as background noise, vehicular noise, etc. may be associated with images that do not depict motion of interest.

In some implementations, the calculated motion score may be stored in association with the image, e.g., in motion image metadata, as a label associated with the motion image, in a database that stores data about motion images, etc. The stored motion score may be accessed, e.g., when generating a user interface that includes the motion image, when suggesting creation of motion artifacts or other image creations, etc.

In block 320, which is performed if a count of views of the motion image meets the viewership threshold or if a motion artifact was created from the motion image, the motion score may be set to a value that meets the display threshold. For example, a motion score may be calculated as described with reference to block 316 and compared with the display threshold. If the motion score does not meet the display threshold, the motion score may be set to a value that meets the display threshold. Updating the motion score in this manner can ensure that user input indicative of the interestingness of a motion image overrides automatically determined motion scores, such that motion images that the user is interested in are displayed in a manner that allows the user to perceive the motion, e.g., by displaying the plurality of frames of the motion image in succession.

Block 330 is performed if the motion image is not stable (as determined in block 304), if the level of movement of the subject does not meet the threshold level of movement (block 308) or if the subject type of the motion image is landscape or inanimate object (block 310). In block 330, the motion score may be set to a value that does not meet the display threshold, e.g., a value lower than the display threshold. Setting the motion score in this manner can ensure that motion images that do not provide for a high quality viewing experience, e.g., shaky or unstable images, images where the subject has minimal movement, or where the subject type is not suitable for display of the plurality of frames of the motion image, are displayed as static images, e.g., by displaying only a particular frame of the motion image, as described above with reference to FIG. 2. Setting the motion score in this manner saves computational resources to render the plurality of frames of the image, and can also save storage space when the motion image is stored to non-volatile memory, or sent to a server or other client device.

While method 300 has been described with reference to various blocks in FIG. 3 it may be understood that techniques described in this disclosure may be performed without performing some of the blocks of FIG. 3. For example, some implementations, e.g., when the count of views or information regarding creation of motion artifacts is not available, blocks 312, 314, and 320 are not performed. In some implementations, one or more of the blocks illustrated in FIG. 3 may be combined. In various implementations, some of the blocks of method 300 may be performed in parallel or in an order different from that illustrated in FIG. 3.

Figure 4:
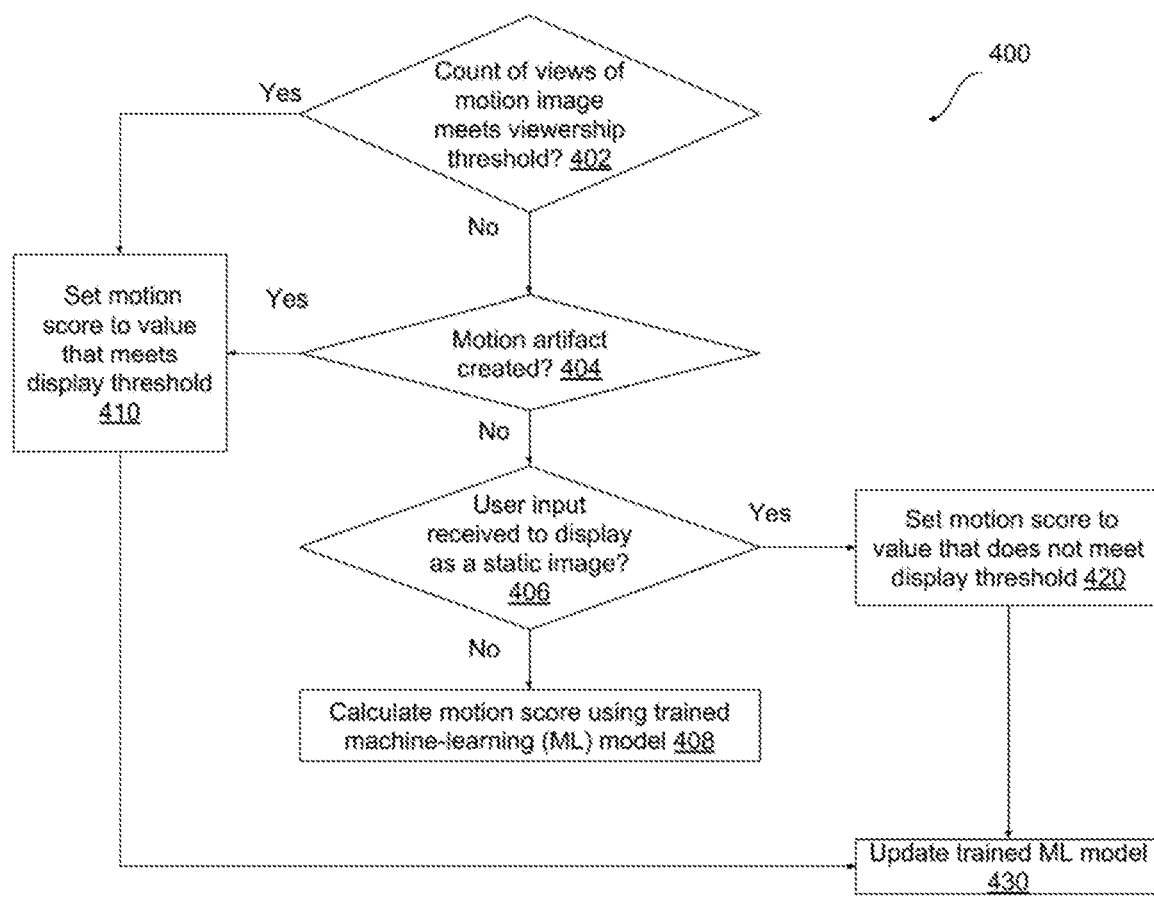
FIG. 4 is a flow diagram illustrating another example method to determine motion score for a motion image, according to some implementations.

FIG. 4 is a flow diagram illustrating an example method 400 to determine motion score for a motion image, according to some implementations. In some implementations, method 400 can be implemented, for example, on a server system 102 as shown in FIG. 1. In some implementations, some or all of the method 400 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device.

In some implementations, the method 400, or portions of the method, can be initiated automatically by a system. In some implementations, the implementing system is a first device. For example, the method (or portions thereof) can be periodically performed, or performed based on one or more particular events or conditions, e.g., an application (e.g., camera application 152, image management application 156, etc.) being initiated by a user, receiving one or more images that have been newly uploaded to or accessible by the system, a predetermined time period having expired since the last performance of method 400, and/or one or more other conditions occurring which can be specified in settings read by the method. In some implementations, such conditions can be specified by a user in stored custom preferences of the user.

In various implementations, client device 120 can be a standalone camera, cell phone, smartphone, tablet computer, wearable device, or other client device that can receive content input (e.g., image capture) by a user to the client device, and can perform the method 400. In another example, a client device or server device can perform the method 400. Some implementations can initiate method 400 based on user input. A user (e.g., operator or end-user) may, for example, have selected the initiation of the method 400 from a displayed user interface, e.g., application user interface or other user interface. In some implementations, method 400 may be implemented by a client device. In some implementations, method 400 may be implemented by a server device.

In block 402, it is determined if the count of views of the motion image meets a viewership threshold. Block 402 may be similar to block 312 described with reference to FIG. 3. If the count of views meets the viewership threshold, block 402 is followed by block 410. Else, block 402 is followed by block 404.

In block 404, it is determined if a motion artifact was created from the motion image. Block 404 may be similar to block 314 described with reference to FIG. 3. If at least one motion artifact was created, block 404 is followed by block 410. Else, block 404 is followed by block 410.

In block 406, it is determined if user input has been received to display the motion image as a static image, e.g., by displaying a particular frame of the motion image. For example, the user may provide such input by choosing an option such as "turn motion off for this image." Such user input may be an indication that the viewer does not find the motion within the image of interest. If the user input has been received, block 406 is followed by block 420. Else, block 406 may be followed by block 408.

In block 408, the motion score for the motion image is calculated. In some implementations, the motion score is calculated by applying a trained machine-learning model that comprises a neural network that includes a plurality of nodes organized in a plurality of layers and configured to determine motion scores for images. The motion image is provided as input to the trained machine-learning model.

Some implementations include training a machine-learning model to determine motion scores for motion images. For example, an untrained machine-learning model may comprise a neural network that includes a plurality of nodes organized in a plurality of layers. Nodes in each layer may be connected to nodes in a previous layer and nodes in a subsequent layer. Nodes in the first layer may be configured to accept motion images as input and nodes in a last layer of the plurality of layers may be configured to output the motion score. Each node may be any type of neural network node, e.g., a LSTM node.

Prior to the training, each of the nodes may be assigned an initial weight and connections between nodes of different layers of the neural network may be initialized. A training dataset of motion images may be obtained and provided as input to the neural network. For example, the training dataset may include a plurality of motion images and associated motion scores or labels. For example, a first set of motion images in the training dataset may be associated with one or more labels that indicate that the subject motion in each of the images is of user interest. Such labels may be obtained based on user input, or from user data (e.g., viewership of the motion images, creation of motion artifacts, etc.) obtained with user permission.

A second set of motion images in the training dataset may be associated with one or more labels that indicate that the subject motion in each of the images of the second set is not of user interest. The labels may be obtained based on user input, or from user data (e.g., discarding frames of a motion image, deleting a motion image, etc.) obtained with user permission. The first set may be referred to as positive training examples and the second set may be referred to as "negative training examples." The training set may include motion images that depict various types of subject, with varying levels of stability, and level of movement of the subject within the plurality of frames. The training set may be selected to ensure that the training set includes examples of different types of images that may be subsequently provided as input to the model during field use.

The plurality of motion images may be provided as input to the model under training and the model may be configured to output a motion score for each of the training images. In some implementations, the training images and associated labels may first be provided as input to the model under training. In this phase of training, weights of individual nodes (and optionally, the number of nodes), connectivity between nodes in different layers (or optionally, the number of layers) may be automatically adjusted such that the motion scores output by the model match the motion scores in the associated labels. In some implementations, this may be referred as an initial training phase.

In some implementations, a subset of the training set of images may be excluded in the initial training phase. This subset may be provided after the initial training phase and the motion scores output by the model may be compared with the motion scores associated with images in the subset. If the motion scores do not match, such mismatch may be provided as training inputs to the model (reinforcement learning). In this phase, model parameters such as the weights of one or more nodes, connectivity between nodes, etc. may be adjusted until the model correctly predicts the motion scores for the subset of images. The second phase may be repeated any number of times, e.g., until the model achieves a satisfactory level of accuracy in predicting motion scores. In some implementations, the trained model may be further modified, e.g., compressed (to use fewer nodes or layers), transformed (e.g., to be usable on different types of hardware), etc. The trained model may be provided on a device, e.g., client device 120 or a server device, to calculate motion scores for motion images. In some implementations, different versions of the model may be provided, e.g., a client-version of the model may be optimized for size and to have reduced computational complexity, whereas a server-version of the model may be optimized for accuracy.

In block 408, The motion image is provided as input to the trained machine-learning (ML) model. The trained ML model may calculate the motion score based on the motion image. In some implementations, instead of, or in addition to the motion image, other data about the motion image may be provided as input to the trained ML model. For example, such factors may include a level of stability (e.g., of a background portion) of the motion image, a type of subject of the motion image, or a level of movement of the subject in the motion image. In different implementations, such factors may be determined based on pixel values of the image, using techniques as described with reference to FIG. 3. In some implementations, separate ML models trained to determine the level of stability, the type of subject, or the level of movement of the subject may be provided, and outputs of these ML models may be provided to the trained ML model. In some implementations, the trained ML model may determine such factors as outputs of intermediate layers.

Block 410 is performed if the count of views of the motion image meets the viewership threshold (block 402) or if a motion artifact was created from the motion image (block 404). In block 410, the motion score is set to a value that meets the display threshold, similar to block 320 described with reference to FIG. 3. Block 410 may be followed by block 430.

In block 420, the motion score is set to a value that does not meet the display threshold, e.g., similar to block 330 described with reference to FIG. 3. Block 420 may be followed by block 430.

In block 430, the trained ML model may be updated. For example, when block 430 is performed after block 410, the model may be updated based on the motion score being set to a value that meets the display threshold (based on user input), thus indicating that the motion image depicts motion that is of user interest. In another example, when block 420 is performed after block 420, the model may be updated based on the motion score being set to a value that does not meet the display threshold, thus indicating that the motion image depicts motion that is not of user interest.

In some implementations, updating the ML model may include adjusting a weight of at least one of the plurality of nodes or updating a connection between at least one pair of nodes of the plurality of nodes. In some implementations, the weights may be adjusted such that, after the updating, the ML model calculates a motion score that matches the motion score set in blocks 410 or 420. In some implementations, e.g., when the user does not provide permission for use of user data, block 430 is not performed. In implementations where the user permits use of user data, the updated ML model may be provided to a server, e.g., to enable federated learning. Updating the trained ML model in this manner may enable the motion score calculation to be personalized for the user that views the motion image, and thereby, provide for an improved display of motion images with reduced computational load or reduced storage cost, due to the motion score determined by the ML model correctly indicating the level of interestingness of motion images captured or viewed by the user.

While method 400 has been described with reference to various blocks in FIG. 4, it may be understood that techniques described in this disclosure may be performed without performing some of the blocks of FIG. 4. For example, some implementations, blocks 402 and/or 404 are not performed. In some implementations, one or more of the blocks illustrated in FIG. 4 may be combined. In various implementations, some of the blocks of method 400 may be performed in parallel or in an order different from that illustrated in FIG. 4. For example, in some implementations, blocks 402 and 404 may be performed simultaneously.

Figure 5:
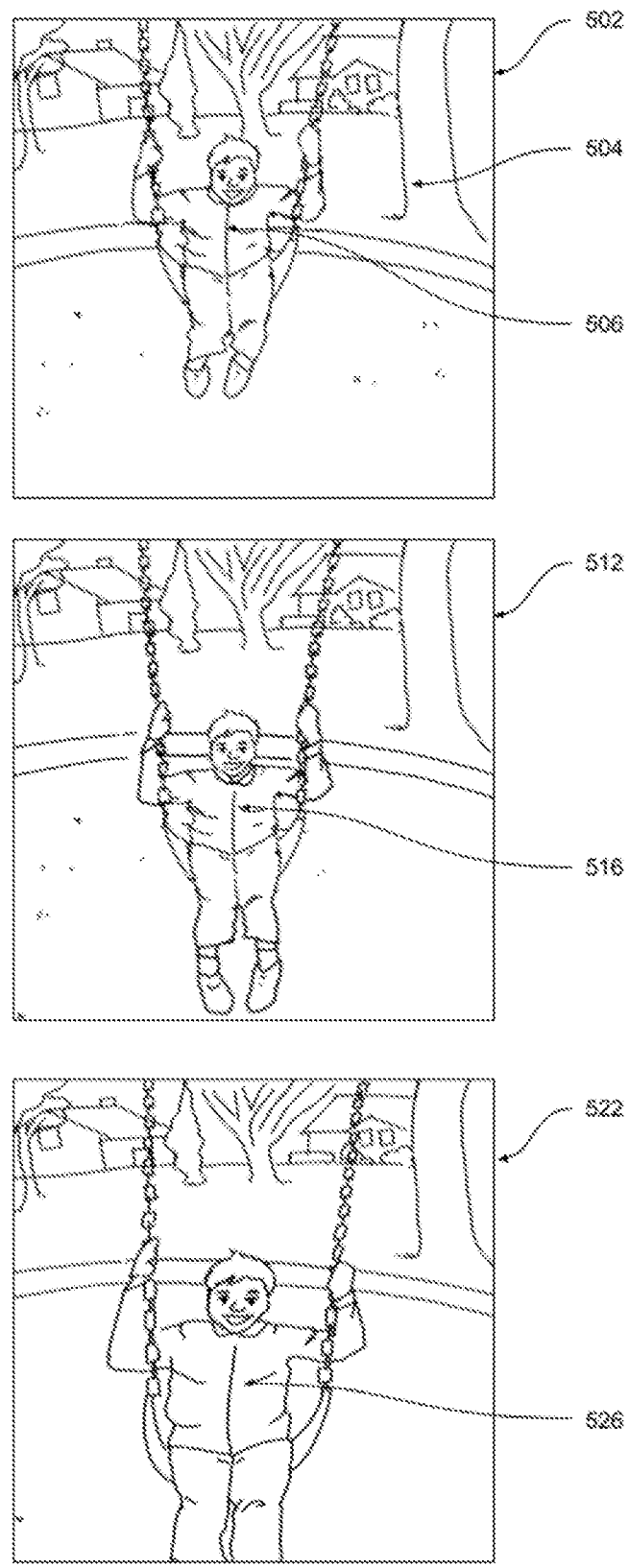
FIG. 5 illustrates an example motion image.

FIG. 5 illustrates an example motion image. In particular, three frames (502, 512, and 522) of an example motion image are shown. The three frames may be captured at different time points within a short interval, e.g., 1-3 seconds. As seen in FIG. 5, a subject (506, 516, 526) of motion image is a person on a swing. During the capture of the motion image, the person rides the swing from back to front and unfolds their legs, as seen in the frames 502, 512, and 522. Such motion may be indicated by depth data stored in the depth image, e.g., when the motion image is captured using a camera that is capable of determining depth information. The motion image also includes a background portion (504).

The motion image illustrated in FIG. 5 includes a subject (a person) that experiences significant motion and may be determined to have a relatively high motion score, e.g., that meets a display threshold. Other motion images may include subjects, e.g., documents, furniture, or other inanimate objects, or a landscape, or may not include significant subject motion, and may be determined to have a relatively low motion score, e.g., that does not meet a display threshold. While FIG. 5 illustrates a stable image (background 504 does not change between the frames 502, 512, and 522), other motion images may include shaky or unstable images, e.g., that have a background that changes between the plurality of frames.

Figure 6:
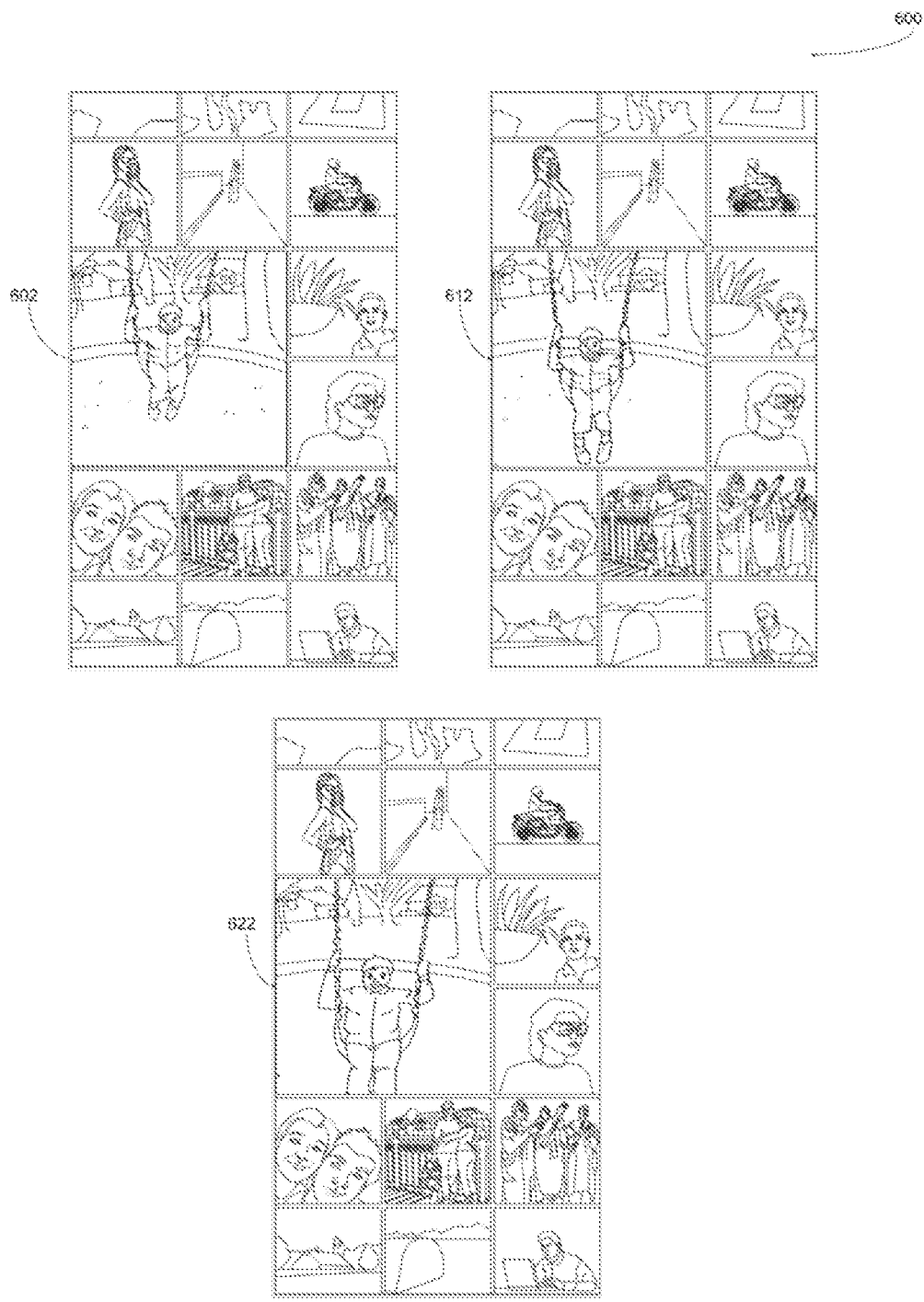
FIG. 6 is a diagrammatic illustration of an example user interface that includes an image grid, according to some implementations.

FIG. 6 is a diagrammatic illustration of an example user interface 600 that includes an image grid. The example user interface shown in FIG. 6 includes the motion image illustrated in FIG. 5 as part of an image grid. Three views (602, 612, 622) of the user interface are shown to illustrate that the user interface displays the plurality of frames of the motion image in succession. In this example, the motion image is shown with a larger size than other images in the image grid.

In this example user interface, a single motion image is shown with the subject motion displayed in the user interface; however, it will be understood that any number, e.g., zero, two, three, or more images may be shown with subject motion, based on respective motion scores of images in the image grid, as explained with reference to FIG. 3. In various implementations, user interface 600 can be displayed by a display device, e.g., by a display screen of a client device 120, 122, 124, and/or 126 of FIG. 1, or a server system 102.

Figure 7:
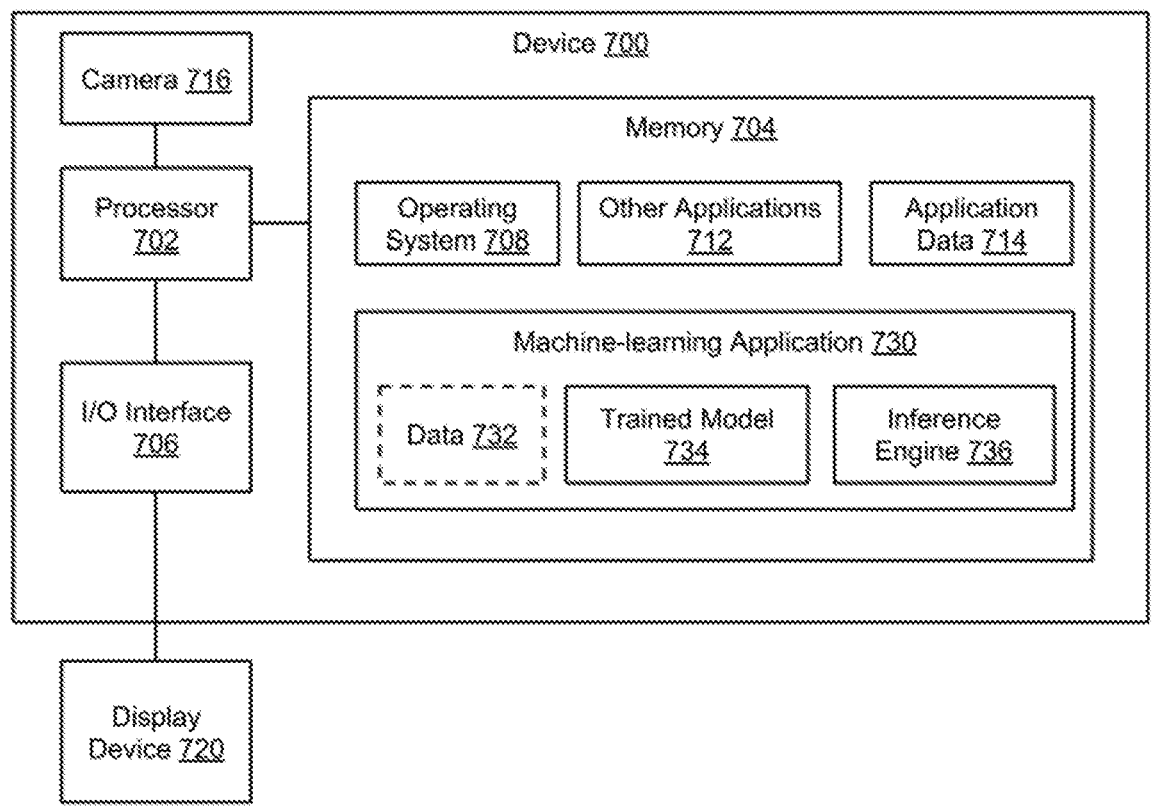
FIG. 7 is a block diagram of an example device which may be used for one or more implementations described herein.

FIG. 7 is a block diagram of an example device 700 which may be used to implement one or more features described herein. In one example, device 700 may be used to implement a client device, e.g., any of client devices (120, 122, 124, 126) shown in FIG. 1. Alternatively, device 700 can implement a server device, e.g., server 104. In some implementations, device 700 may be used to implement a client device, a server device, or both client and server devices. Device 700 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 700 includes a processor 702, a memory 704, input/output (I/O) interface 706, and camera 716. Processor 702 can be one or more processors and/or processing circuits to execute program code and control basic operations of the device 700. A "processor" includes any suitable hardware system, mechanism or component that processes data, signals or other information. A processor may include a system with a general-purpose central processing unit (CPU) with one or more cores (e.g., in a single-core, dual-core, or multicore configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 702 may include one or more co-processors that implement neural-network processing. In some implementations, processor 702 may be a processor that processes data to produce probabilistic output, e.g., the output produced by processor 702 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, machine-learning application 730, other applications 712, and application data 714. Other applications 712 may include applications such as a camera application, an image gallery or image library application, data display engine, web hosting engine, image display engine, notification engine, social networking engine, etc. In some implementations, the machine-learning application 730 and other applications 712 can each include instructions that enable processor 702 to perform functions described herein, e.g., some or all of the methods of FIGS. 2, 3, and 4.

Other applications 712 can include, e.g., a camera application, an image library or image gallery application, media display applications, communication applications, web hosting engines or applications, mapping applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

In various implementations, machine-learning application may utilize Bayesian classifiers, support vector machines, neural networks, or other learning techniques. In some implementations, machine-learning application 730 may include a trained model 734, an inference engine 736, and data 732. In some implementations, data 732 may include training data, e.g., data used to generate trained model 734. For example, training data may include any type of data such as text, images, audio, video, etc. For example, training data may include motion images. Training data may be obtained from any source, e.g., a data repository specifically marked for training, data for which permission is provided for use as training data for machine-learning, etc. In implementations where one or more users permit use of their respective user data to train a machine-learning model, e.g., trained model 734, training data may include such user data. In implementations where users permit use of their respective user data, data 732 may include permitted data such as images or image metadata (e.g., motion images, motion artifacts or other user-generated images, data regarding sharing of images with other users, labels associated with images, etc.), communications (e.g., e-mail; chat data such as text messages, voice, video, etc.), documents (e.g., spreadsheets, text documents, presentations, etc.)

In some implementations, training data may include synthetic data generated for the purpose of training, such as data that is not based on user input or activity in the context that is being trained, e.g., data generated from simulated or computer-generated motion images, etc. In some implementations, machine-learning application 730 excludes data 732. For example, in these implementations, the trained model 734 may be generated, e.g., on a different device, and be provided as part of machine-learning application 730. In various implementations, the trained model 734 may be provided as a data file that includes a model structure or form (e.g., that defines a number and type of neural network nodes, connectivity between nodes and organization of the nodes into a plurality of layers), and associated weights. Inference engine 736 may read the data file for trained model 734 and implement a neural network with node connectivity, layers, and weights based on the model structure or form specified in trained model 734.

Machine-learning application 730 also includes a trained model 734. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. For example, nodes of a first layer (e.g., input layer) may receive data as input data 732 or application data 714. Such data can include, for example, one or more pixels per node, e.g., when the trained model is used for image analysis, e.g., of a motion image that includes a plurality of frames. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a motion score, a set of labels for an image, a representation of the image that permits comparison of the image to other images (e.g., a feature vector for the image), an output sentence in response to an input sentence, one or more categories for the input data, etc.

depending on the specific trained model. In some implementations, model form or structure also specifies a number and/or type of nodes in each layer.

In different implementations, trained model 734 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 734 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 732, to produce a result.

For example, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to assign scores to motion images.

In various implementations, a trained model includes a set of weights, or embeddings, corresponding to the model structure. In implementations where data 732 is omitted, machine-learning application 730 may include trained model 734 that is based on prior training, e.g., by a developer of the machine-learning application 730, by a third-party, etc. In some implementations, trained model 734 may include a set of weights that are fixed, e.g., downloaded from a server that provides the weights.

Machine-learning application 730 also includes an inference engine 736. Inference engine 736 is configured to apply the trained model 734 to data, such as application data 714 (e.g., motion images), to provide an inference. In some implementations, inference engine 736 may include software code to be executed by processor 702. In some implementations, inference engine 736 may specify circuit configuration (e.g., for a programmable processor, for a field programmable gate array (FPGA), etc.) that enables processor 702 to apply the trained model. In some implementations, inference engine 736 may include software instructions, hardware instructions, or a combination. In some implementations, inference engine 736 may offer an application programming interface (API) that can be used by operating system 708 and/or other applications 712 to invoke inference engine 736, e.g., to apply trained model 734 to application data 714 to generate an inference.

Machine-learning application 730 may provide several technical advantages. For example, when trained model 734 is generated based on unsupervised learning, trained model 734 can be applied by inference engine 736 to produce knowledge representations (e.g., numeric representations) from input data, e.g., application data 714. For example, a model trained for image analysis may produce representations of images that have a smaller data size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of inference engine 736. In some implementations, knowledge representations generated by machine-learning application 730 may be provided to a different device that conducts further processing, e.g., over a network. In such implementations, providing the knowledge representations rather than the images may provide a technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In some implementations, machine-learning application 730 may be implemented in an offline manner. In these implementations, trained model 734 may be generated in a first stage, and provided as part of machine-learning application 730. In some implementations, machine-learning application 730 may be implemented in an online manner. For example, in such implementations, an application that invokes machine-learning application 730 (e.g., operating system 708, one or more of other applications 712) may utilize an inference produced by machine-learning application 730, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 734, e.g., to update embeddings for trained model 734.

In some implementations, machine-learning application 730 may be implemented in a manner that can adapt to particular configuration of device 700 on which the machine-learning application 730 is executed. For example, machine-learning application 730 may determine a computational graph that utilizes available computational resources, e.g., processor 702. For example, if machine-learning application 730 is implemented as a distributed application on multiple devices, machine-learning application 730 may determine computations to be carried out on individual devices in a manner that optimizes computation. In another example, machine-learning application 730 may determine that processor 702 includes a GPU with a particular number of GPU cores (e.g., 1000) and implement the inference engine accordingly (e.g., as 1000 individual processes or threads).

In some implementations, machine-learning application 730 may implement an ensemble of trained models. For example, trained model 734 may include a plurality of trained models that are each applicable to same input data. In these implementations, machine-learning application 730 may choose a particular trained model, e.g., based on available computational resources, success rate with prior inferences, etc. In some implementations, machine-learning application 730 may execute inference engine 736 such that a plurality of trained models is applied. In these implementations, machine-learning application 730 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 708 or one or more applications 712.

In different implementations, machine-learning application 730 can produce different types of outputs. For example, machine-learning application 730 can provide representations or clusters (e.g., numeric representations of input data), labels (e.g., for input data that includes images, documents, etc.), phrases or sentences (e.g., descriptive of an image or video, suitable for use as a response to an input sentence, etc.), images (e.g., generated by the machine-learning application in response to input), audio or video (e.g., in response an input video, machine-learning application 730 may produce an output video with a particular effect applied, e.g., rendered in a comic-book or particular artist's style, when trained model 734 is trained using training data from the comic book or particular artist, etc. In some implementations, machine-learning application 730 may produce an output based on a format specified by an invoking application, e.g. operating system 708 or one or more applications 712. In some implementations, an invoking application may be another machine-learning application. For example, such configurations may be used in generative adversarial networks, where an invoking machine-learning application is trained using output from machine-learning application 730 and vice-versa.

Any of software in memory 704 can alternatively be stored on any other suitable storage location or computer-readable medium. In addition, memory 704 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. Interfaced devices can be included as part of the device 700 or can be separate and communicate with the device 700. For example, network communication devices, storage devices (e.g., memory and/or database 106), and input/output devices can communicate via I/O interface 706. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 706 can include one or more display devices 720 that can be used to display content, e.g., images, video, and/or a user interface of an output application as described herein. Display device 720 can be connected to device 700 via local connections (e.g., display bus) and/or via networked connections and can be any suitable display device. Display device 720 can include any suitable display device such as an LCD, LED, or plasma display screen, CRT, television, monitor, touchscreen, 3-D display screen, or other visual display device. For example, display device 720 can be a flat display screen provided on a mobile device, multiple display screens provided in a goggles or headset device, or a monitor screen for a computer device.

The I/O interface 706 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

Camera 716 may be any type of camera that can capture a motion image that includes a plurality of frames. In some implementations, camera 716 may include a plurality of lenses that have different capabilities, e.g., front-facing vs. rear-facing, different zoom levels, image resolutions of captured images, etc. In some implementations, device 700 may include one or more sensors, such as a depth sensor, an accelerometer, a location sensor (e.g., GPS), a gyroscope, etc. In some implementations, the one or more sensors may be operated together with the camera to obtain sensor readings corresponding to different frames of the motion image captured using the camera.

For ease of illustration, FIG. 7 shows one block for each of processor 702, memory 704, I/O interface 706, camera 716, and software blocks 708, 712, and 730. These blocks may represent one or more processors or processing circuitries, operating systems, memories, I/O interfaces, applications, and/or software modules. In other implementations, device 700 may not have all of the components shown and/or may have other elements including other types of elements instead of, or in addition to, those shown herein. While some components are described as performing blocks and operations as described in some implementations herein, any suitable component or combination of components of environment 100, device 700, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to display a motion image that includes a plurality of frames, the method comprising:
   determining a motion score for the motion image based on the plurality of frames of the motion image, wherein the determining comprises:
      determining, based on respective pixel values of the plurality of frames, a level of stability of a background portion of the motion image, a type of a subject of the motion image, and a level of movement of the subject in the motion image; and
      calculating the motion score based on the level of stability, the type of the subject, and the level of movement of the subject;
   determining whether the motion score meets a display threshold;
   if the motion score meets the display threshold, causing the motion image to be displayed with subject motion by displaying the plurality of frames of the motion image in succession; and
   if the motion score does not meet the display threshold, causing the motion image to be displayed without subject motion by displaying a particular frame of the plurality of frames of the motion image.

2. The computer-implemented method of claim 1, wherein the motion image is displayed in a user interface that includes one or more other images, and wherein if the motion score meets the display threshold, a size of the motion image in the user interface is larger than at least one of the one or more other images.

3. The computer-implemented method of claim 1, wherein the motion image is displayed as part of a user interface that includes one or more other images, the method further comprising:
   determining a respective motion score of the one or more other images; and
   selecting the display threshold based on the respective motion scores, wherein the selecting comprises:
      determining a number of the one or more other images that are associated with respective motion scores higher than the motion score of the motion image;
      if the number is equal to or higher than a threshold number, setting the display threshold higher than the motion score of the motion image; and
      if the number is lower than the threshold number, setting the display threshold lower than the motion score of the motion image.

4. The computer-implemented method of claim 3, further comprising determining the threshold number based at least in part on a number of execution threads of a software application that displays the motion image.

5. The computer-implemented method of claim 1, wherein the type of subject is landscape or inanimate object, and wherein calculating the motion score comprises setting the motion score to a value less than the display threshold.

6. The computer-implemented method of claim 1, wherein calculating the motion score comprises:

determining whether the level of movement of the subject meets a threshold level of movement;

if it is determined that the level of movement of the subject meets the threshold level of movement, setting the motion score to a value that meets the display threshold; and if it is determined that the level of movement of the subject does not meet the threshold level of movement, setting the motion score to a value that does not meet the display threshold.

7. The computer-implemented method of claim 6, wherein a first type of subject is face and a second type of subject is body, and wherein a first threshold level of movement associated with the face is lower than a second threshold level of movement associated with the body.

8. The computer-implemented method of claim 1, wherein determining the motion score for the motion image further comprises setting the motion score to a value that meets the display threshold if a count of views of the motion image meets a viewership threshold or if at least one motion artifact was created based on the motion image.

9. The computer-implemented method of claim 1, wherein determining the motion score for the motion image comprises applying a trained machine-learning model that comprises a neural network that includes a plurality of nodes organized in a plurality of layers and that is configured to determine motion scores, wherein the motion image is provided as an input to the trained machine-learning model.

10. The computer-implemented method of claim 1, wherein the motion image is captured by a client device and stored in a volatile memory of the client device, the method further comprising:

determining that the motion score meets a storage threshold;

if the motion score meets the storage threshold, storing the motion image in a non-volatile memory of the client device; and if the motion score does not meet the storage threshold, automatically changing the motion image to a static image, wherein the static image includes only a particular frame of the plurality of frames and has a smaller file-size than the motion image, wherein the changing comprises removing other frames of the plurality of frames; and storing the static image in the non-volatile memory of the client device.

11. A device to display a motion image that comprises a plurality of frames, the device comprising:

a processor; and a non-transitory computer readable medium with instructions stored thereon that, when executed by the processor cause the processor to perform operations comprising:

determining a level of stability of a background portion of the motion image;

determining a type of a subject of the motion image and a level of movement of the subject in the motion image;

determining a motion score for the motion image based on the plurality of frames, by applying a trained machine-learning model that comprises a neural network that includes a plurality of nodes organized in a plurality of layers, the trained machine-learning model stored on the device and configured to determine motion scores, wherein the motion image is provided as an input to the trained machine-learning model and the level of stability of the background portion, the type of the subject, and the level of movement of the subject are provided to the trained machine-learning model as further inputs;

determining whether the motion score meets a display threshold;

if the motion score meets the display threshold, causing the motion image to be displayed with subject motion by displaying the plurality of frames of the motion image in succession; and if the motion score does not meet the display threshold, causing the motion image to be displayed without subject motion by displaying a particular frame of the plurality of frames of the motion image.

12. The device of claim 11, wherein the operations further comprise:

determining that a count of views of the motion image meets a viewership threshold or that a motion artifact was created from the motion image; and in response to the determination, updating the trained machine-learning model, wherein updating the trained machine-learning model comprises at least one of:

adjusting a weight of at least one of the plurality of nodes; and updating a connection between at least one pair of nodes of the plurality of nodes.

13. The device of claim 11, wherein the operations further comprise:

receiving user input to display the motion image as a static image by displaying only a particular frame of the plurality of frames; and in response to the user input, updating the trained machine-learning model, wherein updating the trained machine-learning model comprises at least one of:

adjusting a weight of one of the plurality of nodes; and updating a connection between a pair of nodes of the plurality of nodes.

14. The device of claim 11, further comprising a camera, wherein the motion image is captured with the camera and stored in volatile memory of the device, and wherein the operations further comprise:

determining whether the motion score meets a storage threshold;

if the motion score meets the storage threshold, storing the motion image in a non-volatile memory of the device; and if the motion score does not meet the storage threshold, automatically changing the motion image to a static image, wherein the static image includes only a particular frame of the plurality of frames and has a smaller file-size than the motion image, wherein the changing comprises:

removing other frames of the plurality of frames; and storing the static image in the non-volatile memory of the device.

15. A non-transitory computer readable medium with instructions stored thereon that, when executed by a processor, cause the processor to perform operations comprising:

determining a level of stability of a background portion of a motion image;

determining a type of a subject of the motion image and a level of movement of the subject in the motion image;

determining a motion score for a motion image based on the level of stability, the type of the subject, and the level of movement of the subject;

determining whether the motion score meets a display threshold;

if the motion score meets the display threshold, causing the motion image to be displayed with subject motion by displaying the plurality of frames of the motion image in succession; and if the motion score does not meet the display threshold, causing the motion image to be displayed without subject motion by displaying a particular frame of the plurality of frames of the motion image.

16. The non-transitory computer readable medium of claim 15, with further instructions stored thereon that, when executed by the processor, cause the processor to perform operations comprising:

determining a respective motion score of one or more other images; and selecting the display threshold based on the respective motion scores, wherein the selecting comprises:

determining a number of the one or more other images that are associated with respective motion scores higher than the motion score of the motion image;

if the number is equal to or higher than a threshold number, setting the display threshold higher than the motion score of the motion image; and if the number is lower than the threshold number, setting the display threshold lower than the motion score of the motion image.

* * * * *